United States Patent [19]
Sugioka et al.

[11] Patent Number: 6,074,575
[45] Date of Patent: Jun. 13, 2000

[54] THIN FILM ELECTRO-LUMINESCENCE DEVICE

[75] Inventors: Akiko Sugioka; Noriyuki Takahashi; Isamu Yashima, all of Ageo; Makoto Higuchi, Kamioka-machi; Akiyoshi Mikami, Osaka; Kousuke Terada, Osaka; Katsuhiro Okada, Osaka, all of Japan

[73] Assignee: Mitsui Mining & Smelting Co., Ltd., Osaka, Japan

[21] Appl. No.: 09/047,100

[22] Filed: Mar. 24, 1998

Related U.S. Application Data

[63] Continuation-in-part of application No. 08/669,490, Nov. 29, 1996, abandoned.

[30] Foreign Application Priority Data

Nov. 14, 1994 [JP] Japan ................................. 6-302725

[51] Int. Cl.$^7$ ..................................................... H01J 1/63
[52] U.S. Cl. .................................. 252/301.4 S; 313/503
[58] Field of Search ...................... 252/301.4 S; 313/503

[56] References Cited

U.S. PATENT DOCUMENTS

| | | | |
|---|---|---|---|
| 3,623,996 | 11/1971 | Amster | 252/301.4 S |
| 3,639,254 | 2/1972 | Peters | 252/301.4 S |
| 3,742,277 | 6/1973 | Peters | 313/92 PH |
| 5,309,070 | 5/1994 | Sun et al. | 313/503 |
| 5,505,986 | 4/1996 | Velthaus et al. | 427/66 |
| 5,598,059 | 1/1997 | Sun et al. | 313/509 |
| 5,612,591 | 3/1997 | Kataama et al. | 313/503 |
| 5,747,929 | 5/1998 | Kato | 313/503 |

FOREIGN PATENT DOCUMENTS 0 667 383 A2  8/1995  European Pat. Off. .

OTHER PUBLICATIONS

Database WPI, Section Ch, Week 9622; Derwent Publications Ltd., london, GB; Class L03, AN 96–219175 & JP–A–08 083 685 (Sharp KK), Mar. 26, 1996.

Applied Physic Letters; Benalloul et al.; vol. 63, No. 14, Oct. 4, 1993, pp. 1954–1956; "IIA–III$_2$–S$_4$ ternary compouns: New host matrices for full color thin film electroluminescene dispalys".

Materials Science and Engineering B, Le Thi et al.; vol. B14, No. 4, Sep. 1, 1992, pp. 393–397; "Investigation of the MS–Al$_2$S$_3$ systems (M×Ca, Sr, Ba) and luminescence properties of europium–doped thioaluminates".

Journal of Solid State Chemistry; vol. 83 No. 2, Dec. 1989, pp. 316–323; Davolos et al.; "Luminescence of Eu$^{2+}$in Strontium and Barium Thioglallates".

Database WPI, Section Ch, Week 7828; Derwent Publications Ltd., London GB; Class L03, AN 78–50468A & JP–A–53 061 964 (Dainippon Toryo KK), Jun. 2, 1978.

Derwent Publications Ltd. Section Ch, Week 9622; AN 96–219175 & JP–A–08 083 685 (Sharp KK), Mar. 26, 1996.

Applied Physics Letters, vol. 63, No. 14, Oct. 4, 1993, pp. 1954–1956; Benalloul et al., "IIA–III2–S4 Ternary Compounds: . . . ".

Materials Science & Engineering, vol. B14, No. 4, Sep. 1, 1992; pp. 393–397; Le Thi et al., "Investigation of the MS–AL2S3 Systems . . . ".

Journal of Solid State Chemistry, Dec. 1989, vol. 83, No. 2, pp. 316–323; Davolos et al., "Luminescence of Eu/sup 2+/ in strontium . . . ".

Derwent Publications Ltd. Section Ch, Week 7828; AN 78–50468A & JP–A–53 061 964 (Dainippon Toryo KK), Jun. 2, 1978.

*Primary Examiner*—Paul R. Michl
*Attorney, Agent, or Firm*—Kubovcik & Kubovcik

[57] ABSTRACT

A thin film electro-luminescence composition comprising an alkaline earth metal thiogallate represented by the following compositional formula:

$$M^1_{a-x}Ga_{2b}S_{(a+3b)} : RE_x$$

wherein $M^1$ is Sr or Ba; RE is a lanthanoid element; a and b are integers which are different from each other; and wherein x is 0.001 to 0.1 with the proviso that $$Ba_{4-x}Ga_2S_7 : RE_x \text{ is excluded}$$

is excluded
or comprising an alkaline earth metal thioaluminate represented by the following compositional formula:

$$M^2_{c-y}Al_{2d}S_{(c+3d)} : RE_y$$

wherein $M^2$ is Ca, Sr or Ba; RE is a lanthanoid element; c and d are integers which may be different from each other; and wherein y is 0.001 to 0.1,
and a thin film electro-luminescence device comprising said thin film electro-luminescence composition as a luminescence layer.

13 Claims, 10 Drawing Sheets

THIN FILM ELECTRO-LUMINESCENCE DEVICE

This application is a continuation-in-part of Ser. No. 08/669,490 filed Nov. 29, 1996 and now abandoned.

TECHNICAL FIELD

This invention relates to an electro-luminescence device (hereinafter abbreviated to "EL" device) luminescing by the application thereto of an electric field and more particularly to a thin film EL composition useful in the thin film luminescence layer of the device and a thin film EL device using said composition therein.

PRIOR ART

Studies of red color-, green color- and blue color-emitting EL compositions are in progress to attain the full coloration of a thin film EL panel. However, there has not been obtained yet any satisfactory blue color-emitting composition exhibiting high luminance and excellent chromatic purity (excitation purity). One of the most advanced blue color-emitting compositions is SrS:Ce and has recently been developed to have remarkably improved luminance and chromatic purity. However, it is anticipated from, for example, the size of the site for Ce as a substituent that the luminescence peak of SrS:Ce is not shifted to the side of a wavelength shorter than about 480 nm and therefore SrS:Ce does not emit pure blue-colored light. Further, SrS itself exhibits deliquescence and requires heating at 1400° C. or above and the like to be completely synthesized, thereby to constitute a barrier to the industrial production thereof.

A thin film EL device using $MGa_2S_4$:Ce therein (wherein M is an alkaline earth metal) has recently been developed and attracts attention since it exhibits highluminance and luminesces at a shorter wavelength (Japanese Pat. Appln. Laid-Open gazette No. Hei. 5-65478). Further, Davlous et al. reported that strontium thiogallate and barium thiogallate each having $Eu^{2+}$ added thereto luminesce mainly in the blue-color region [J. Solid. State Chem. 83, 316 (1989)]. Additionally, LeThi et al. reported that alkaline earth metal thioaluminates each having $Eu^{2+}$ added thereto luminesce mainly in the green-color region [Mat. Sci. Eng. B14 (1992) 393]. As compared with SrS, such thiogallates and thioaluminates have an advantage that their synthesis temperature is generally as low as about 1100° C. this being industrially superior. The thioaluminate corresponds to a compound prepared by replacing the gallium of the thiogallate by aluminum, and the site for a lanthanoid element as a substituent (in other words, the site for an alkaline earth metal) in the thioaluminate tends to be generally larger than that in the thiogallate. Accordingly, it is thought that the emission spectrum of the thioaluminate is shifted to a shorter wavelength side thereby to emit purer blue particularly when the thioaluminate contains Eu or Ce as a substituent.

However, there has not been obtained as yet any satisfactory blue-emitting thin film EL device which is more excellent in chromatic (excitation) purity and chromaticity coordinates.

DISCLOSURE OF THE INVENTION

An object of this invention is to provide a thin film EL composition from which a blue-emitting body for EL is obtained and which is excellent in chromaticity coordinates and easily producible industrially production can be produced and also to provide a thin film EL device comprising a luminescence layer made from said composition.

The above object can be attained by providing a thin film EL composition which will now be described below.

More particularly, this invention resides in a thin film EL composition comprising an alkaline earth metal thiogallate represented by the following compositional formula:

$$M^1_{a-x}Ga_{2b}S_{(a+3b)}:RE_x$$

(wherein $M^1$ is Sr or Ba; RE is a lanthanoid element; a and b are integers which are different from each other; and wherein x is 0.001 to 0.1 with the proviso that $Ba_{4-x}Ga_2S_7:RE_x$ is excluded).

In the above formula, as described above, $M^1$ represents strontium (Sr) or barium (Ba); and RE represents a lanthanoid element such as lanthanum (La), cerium (Ce), praseodymium (Pr), neodymium (Nd) or europium (Eu). Among these lanthanoid elements, cerium is preferably used and is inexpensive and therefore economical. Although a and b are each an integer, they are different from each other, and a is preferably 1 to 5, and b is preferably 1 to 2. Further, if x is less than 0.001, it is too small to obtain a thin film EL composition having a sufficient emission intensity. On the other hand, if x is more than 0.1, a thin film EL composition having a sufficient emission intensity cannot be obtained, since when concentration of the lanthanoid element increases, luminescence centers (dopants) approach each other, undesirably causing interaction among the dopants, which lowers the obtained thin film EL composition in luminescence efficiency.

As described above, this invention resides in a thin film EL composition comprising the above alkaline earth metal thiogallate as the matrix and an lanthanoid element such as cerium as the dopant (luminescence center). Examples of such a thin film electro-luminescence composition are $Ba_{1-x}Ga_4S_7:Ce_x$, $Ba_{3-x}Ga_2S_6:Ce_x$ and $Sr_{2-x}Ga_2S_5:Ce$. Additionally, it is preferable that the thin film EL composition of this invention further contain a charge compensation agent such as potassium.

Such a thin film EL composition can be produced by, e.g., the following process. More particularly, it is produced by mixing $SrCO_3$ or $BaCO_3$ with $Ga_2O_3$ in a proper molar ratio, adding $CeF_3$ as a material for the dopant and KCL as a material for the charge compensation agent to the obtained mixture and then firing the whole thus obtained at 900 to 1100° C. in a $H_2S$ atmosphere. Of course, SrS, BaS, $Ga_2S$ $CeO_2$ and the like may be used instead of the above raw materials and material for the charge compensation agent is not limited to potassium but may be any compound which may give a monovalent cation having a proper ion radius. Alternatively, the charge compensation agent may be a trivalent ion having a proper ion radius. For example, N, As, Sb or the like can be used for the trivalent ion. Preferably, the charge compensation agent is contained in the thin film EL composition in an amount of 0.5 to 1.5 times of the x value.

This invention also resides in a thin film EL composition comprising an alkaline earth metal thioaluminate represented by the following compositional formula:

$$M^2_{c-y}Al_{2d}S_{(c+3d)}:RE_y$$

(wherein $M^2$ is Ca, Sr or Ba; RE is a lanthanoid element; c and d are integers which may be different from each other; and wherein y is 0.001 to 0.1).

In the above formula, as described above, $M^2$ represents calcium (Ca), strontium (Sr) or barium (Ba); and RE represents a lanthanoid element such as lanthanum (La), cerium (Ce), praseodymium (Pr), neodymium (Nd) or europium (Eu), among which cerium or europium is preferably used. In particular, as described above, cerium is inexpensive and therefore economical. Further, c and d are each an integer and they may be different from each other, and c is preferably 1 to 5, and d is preferably 1 to 2. If y is less than 0.001, it is too small to obtain a thin film EL composition having a sufficient emission intensity. On the other hand, if y is more than 0.1, a thin film EL composition having a sufficient emission intensity cannot be obtained, since when concentration of the lanthanoid element increases, luminescence centers (dopants) approach each other, undesirably causing interaction among the dopants, which lowers the obtained thin film EL composition in luminescence efficiency.

As described above, this invention also resides in a thin film EL composition comprising the above alkaline earth metal thioaluminate as the matrix material and a lanthanoid element such as cerium as the dopant (luminescence center). Examples of such a thin film EL composition are $Ca_{2-y}Al_2S_5:Ce_y$, $Ba^{1-y}Al_4S_7:Ce_y$, $Ba_{4-y}Al_2S_7:Ce_y$, $Ba_{5-y}Al_2S_8:Ce_y$, $Sr_{2-y}Al_2S_5:Ce_y$, $Ba_{2-y}Al_2S_5:Ce_y$, $Ca_{2-y}Al_2S_5:Eu_y$, $Ba_{1-y}Al_4S_7:Eu_y$, $Ba_{4-y}Al_2S_7:Eu_y$, $Ba_{5-y}Al_2S_8:Eu_y$, $Sr_{2-y}Al_2S_5:Eu_y$ and $Ba_{2-y}Al_2S_5:Eu_y$.

Such a thin film EL composition can be produced by, e.g. the following process. Namely, it is produced by sulfuretting $CaCO_3$, $SrCO_3$, $BaCO_3$, or the like under suitable conditions to obtain CaS, SrS, BaS or the like, mixing the alkaline earth metal sulfide with $Al_2S_3$ in a proper molar ratio, adding $CeCl_3$ or $Eu_2O_3$ as a dopant material to the resulting mixture and then firing the whole thus obtained at 900 to 1000° C. in a $H_2$ atmosphere. Of course, $Al_2O_3$, $CeO_2$, $CeF_3$, $Ce_2F_3$, $EuF_3$ and the like may be used instead of the above compounds as starting materials. Alternatively, a mixture preliminarily prepared by mixing an alkaline earth metal compound with an aluminum compound may be sulfuretted at one time. Furthermore, when Ce is used as a dopant, the co-addition of a monovalent cation (such as K or Na) having a proper ion radius and a trivalent ion as charge compensation agents increases the resulting EL composition in intensity of luminescence. For example, N, As, Sb or the like can be used for the trivalent ion. Preferably, the charge compensation agent is contained in the thin film EL composition in an amount of 0.5 to 1.5 times of the y value.

Figure 1:
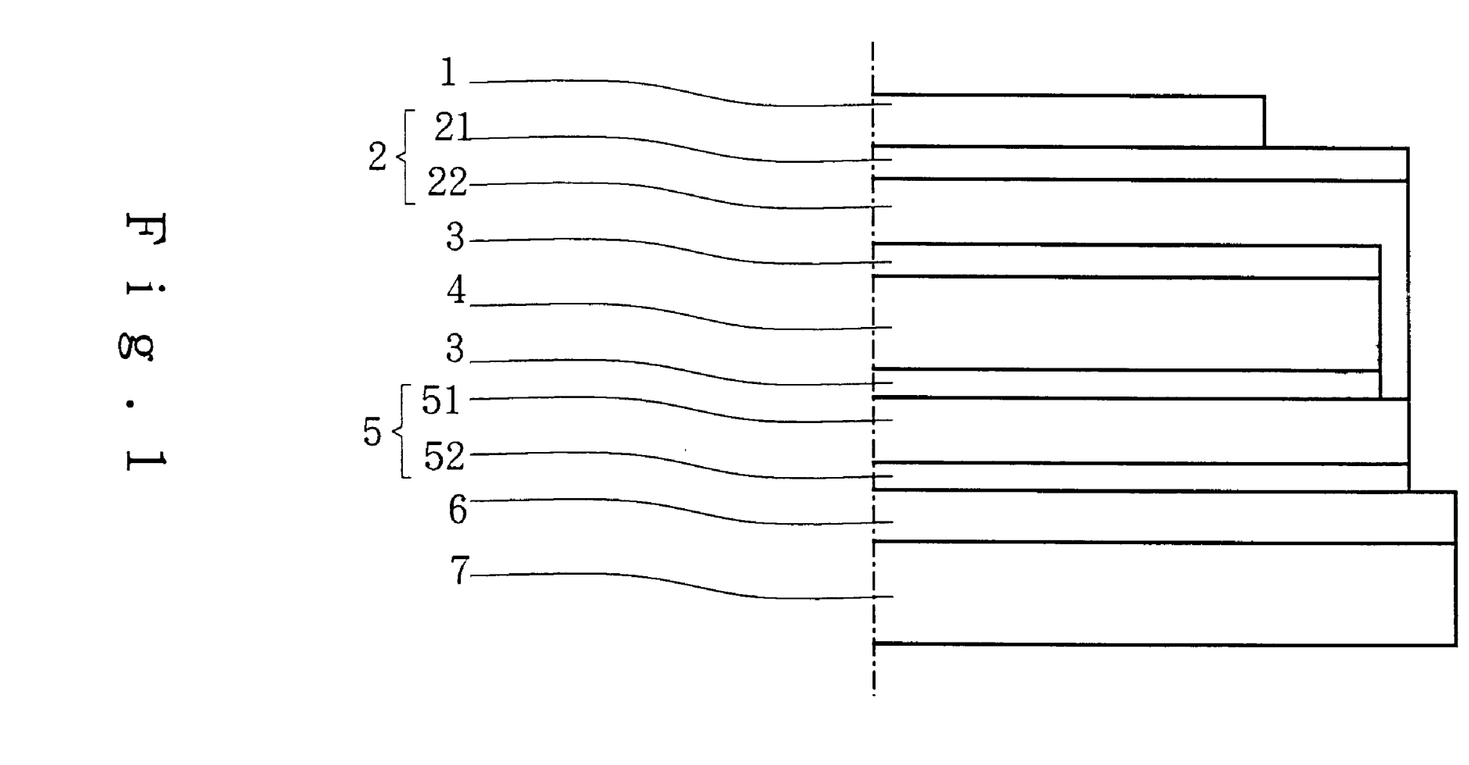
FIG. 1 is a schematic view showing the constitution of a thin film EL device of this invention.

The thin film EL device of this invention is one comprising a luminescence layer made from the above thin film EL composition. FIG. 1 shows an example of the constitution of such a thin film EL device. In FIG. 1, numeral 1 refers to an upper electrode (rear electrode) made of Al or the like, 2 (21 and 22) an upper insulating layer, 3 a buffer layer, 4 a luminescence layer, 5 (51 and 52) a lower insulating layer, 6 a lower electrode (transparent electrode) made of ITO ($In_2O_3$—$SnO_2$) and 7 a glass substrate.

The thin film EL device shown in FIG. 1 is a double-insulated one in which the luminescence layer is sandwiched in between the upper and lower insulating layers (films) and which has a structure produced by stacking one upon another a lower electrode (transparent electrode), a lower insulating layer, a buffer layer, a luminescence layer, a buffer layer, an upper insulating layer and an upper electrode (rear electrode) on a glass substrate in said order. An ITO film is used as the transparent electrode, which can be formed into a film having a thickness of about 20 nm by an electron beam (EB) vapor deposition or high frequency sputtering method. The lower insulating layer can be formed by making $SiO_2$ grow by a high frequency sputtering method and then making $Si_3N_4$ grow on the $SiO_2$ layer in a stacked state. Although the luminescence layer may be formed by an EB evaporation method, a high-frequency sputtering method or the like. In Example 4 which will be described later, the luminescence layer was formed by sputtering at a substrate temperature of 100 to 150° C. in an Ar gas atmosphere containing 8% of hydrogen sulfide. A $Si_3N_4$ layer and a $SiO_2$ layer are formed by high-frequency sputtering as the upper insulating layer, followed by heat treatment to 630 to 700° C. in a vacuum for about one hour to further form on said layer an upper electrode made of Al or the like by vacuum vapor deposition.

The upper insulating layer 2 is composed of a $SiO_2$ layer 21 and a $Si_3N_4$ layer 22, while the lower insulating layer 5 is composed of a $Si_3N_4$ layer 51 and a $SiO_2$ layer 52. The thicknesses of the foregoing layers are, e.g., as follows: $SiO_2$ layer 21, 0.005 $\mu$m; $Si_3N_4$ layer 22, 0.12 $\mu$m; buffer layer 3, 0.1 $\mu$m; luminescence layer 4, 0.6 $\mu$m; $Si_3N_4$ layer 51, 0.2 $\mu$m; and $SiO_2$ layer 52, 0.05 $\mu$m.

EXAMPLE

This invention will now be illustrated by referring to the following Examples.

Example 1

A mixture composed of $BaCO_3$ and $Ga_2O_3$ in a molar ratio of 1:2 was provided as a starting material, heated to 900° C. in a $H_2S$ atmosphere for 5 hours and then screened to adjust particle sizes. The resulting material was heated to 1000° C. in a $H_2S$ atmosphere for 5 hours, again screened to adjust particle sizes and then incorporated with $CeF_3$ and KCl each in an amount of 10 mol %. The mixture thus obtained was heated to 1100° C. in a $H_2S$ atmosphere for 5 hours. The concentration of Ce and K in the thus obtained compound was determined by means of emission spectrography and as a result of this, it was found that the compound contained 9.8 mol % of Ce and 8.0 mol % of K.

Figure 2:
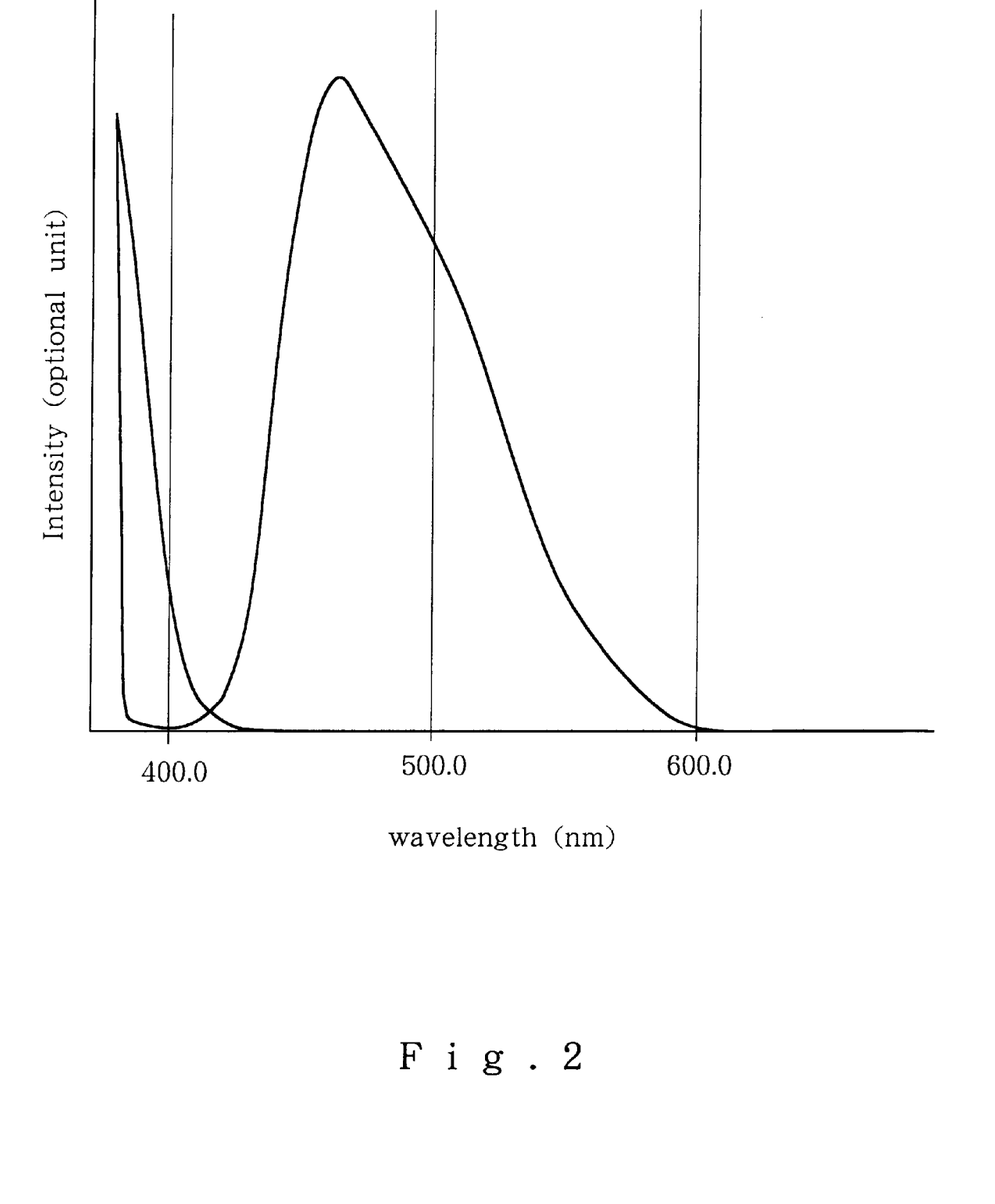
FIG. 2 is a graph showing the photo-luminescence of $Ba_{0.902}Ga_4S_7:Ce_{0.098},K_{0.08}$, a composition for an EL device.

The compound ($Ba_{0.902}Ga_4S_7:Ce_{0.098},K_{0.08}$) thus obtained was excited at 374 nm to present photo-luminescence which is shown in FIG. 2. it can be understood from FIG. 2 that the photo-luminescence has a peak in the neighborhood of 460 nm.

Figure 3:
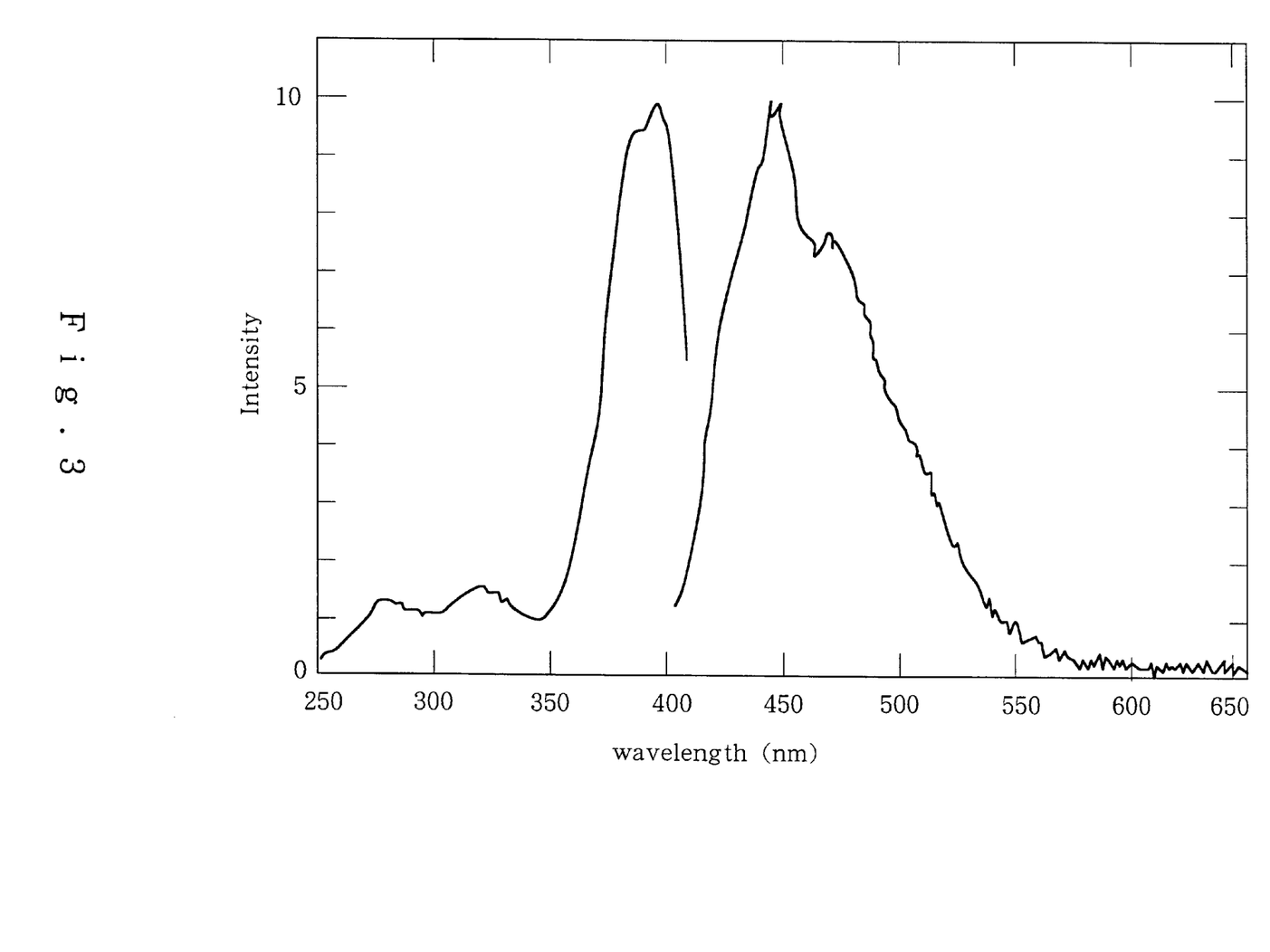
FIG. 3 is a graph showing the electro-luminescence of a $Ba_{0.902}Ga_4S_7:Ce_{0.098},K_{0.08}$ thin film EL device.

Further, a thin film luminescence layer made of the above compound and an insulating layer were formed under the conditions specified in Table 1, after which a thin film EL device as shown in FIG. 1 was produced. This device exhibited blue electro-luminescence which is indicated in FIG. 3. The chromaticity coordinates of the electro-luminescence are: X=0.153 and Y=0.136. The luminance was 0.7 2 cd/m² when the device was driven at 1 kHz.

TABLE 1

| Film-forming conditions | Luminescence layer | Insulating layer ($Si_3N_4$) |
|---|---|---|
| method of growth | high-frequency magnetron sputtering method | |
| sputtering gas | $H_2S$ (5%) + Ar (95%) | |
| pressure of gas (Pa) | 2 | 0.8 |
| substrate temp. (° C.) | 100~300 | 250 |
| sputtering electric power (W) | 150 | 750 |
| rate of growth (Å/min) | 50 | 100 |
| target size (mm) | 80φ | 250φ |

Example 2

A mixture composed of $BaCO_3$ and $Ga_2O_3$ in a molar ratio of 3:1 as a starting material was heated to 900° C. in a $H_2S$ atmospheric for 5 hours. The mixture so heated was screened to adjust particle sizes. The resulting material was heated to 1000° C. in a $H_2S$ atmosphere for 5 hours, again screened to adjust particle sizes, thereafter incorporated with $CeF_3$ and KCl in respective amounts of 1 mol % arid 0.1 mol % and then further heated to 1100° C. in a $H_2S$ atmosphere for 5 hours. The concentration of Ce and K in the thus obtained compound was determined by means of emission spectrography and as a result of this, it was found that the compound contained 0.9 mol % of Ce and 0.05 mol % of K.

Figure 4:
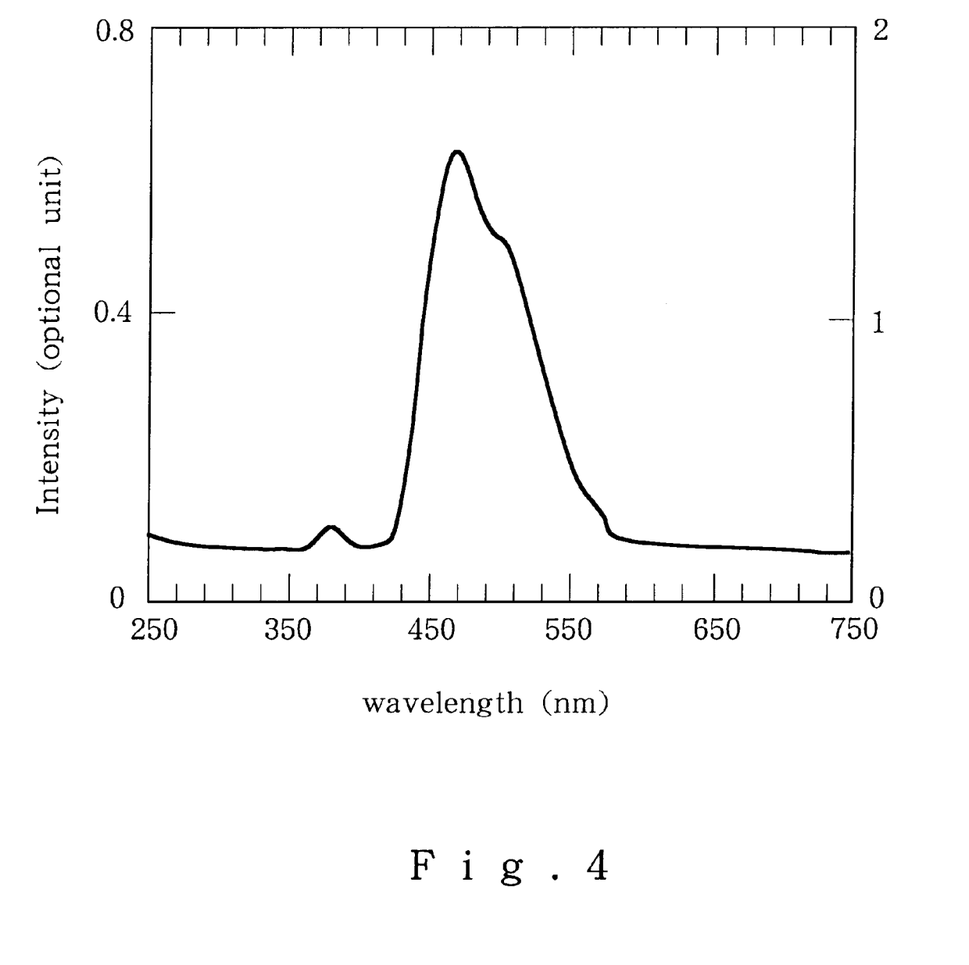
FIG. 4 is a graph showing the photo-luminescence of $Ba_{2.991}Ga_2S_6:Ce_{0.009},K_{0.0005}$, a composition for an EL device.

The photo-luminescence of the thus obtained compound ($Ba_{2.991}Ga_2S_6:Ce_{0.009},K_{0.0005}$), which was determined under the same conditions as in Example 1, is shown in FIG. 4. It can be understood from FIG. 4 that the photo-luminescence has a peak in the neighborhood of 470 nm.

Example 3

A mixture composed of $SrCO_3$ and $Ga_2O_3$ in a molar ratio of 2:1 as a starting material was heated to 880° C. in a $H_2S$ atmosphere for 5 hours and then adjusted in particle sizes by screening. The resulting material was heated to 880° C. in a $H_2S$ atmosphere for 5 hours, thereafter again screened to adjust particle sizes, incorporated with $CeF_3$ and KCl each in an amount of 10 mol % and then further heated to 880° C. in a $H_2S$ atmosphere for 5 hours. The concentration of Ce and K in the obtained compound was determined by means of emission spectrography and as a result of this, it was found that the compound contained 9.5 mol % of Ce and 8.2 mol % of K.

Figure 5:
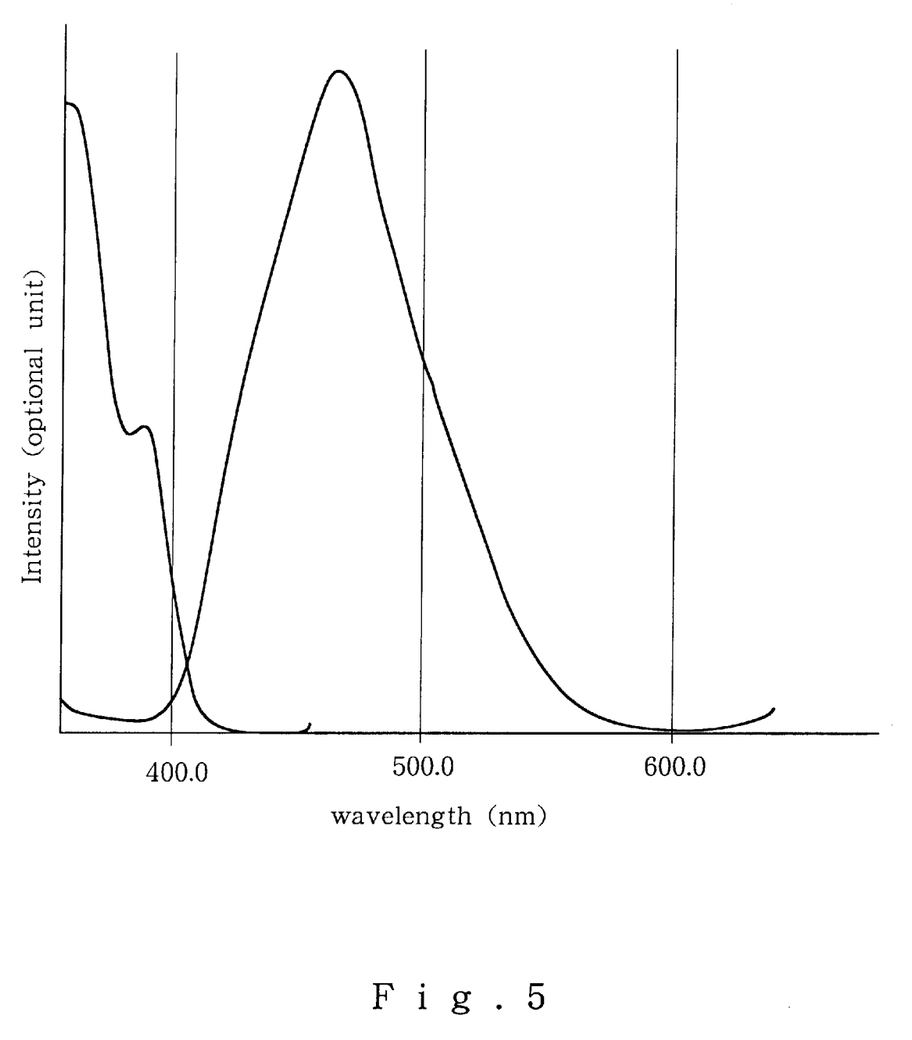
FIG. 5 is a graph showing the photo-luminescence of $Sr_{1.905}Ga_2S_5:Ce_{0.095},K_{0.082}$, a composition for an EL device.

The photo-luminescence of the thus obtained compound ($Sr_{1.905}Ga_2S_5:Ce_{0.095},K_{0.082}$) which was determined under the same conditions as in Example 1, is shown in FIG. 5, from which it can be understood that the photo-luminescence has a peak in the neighborhood of 460 nm.

Figure 6:
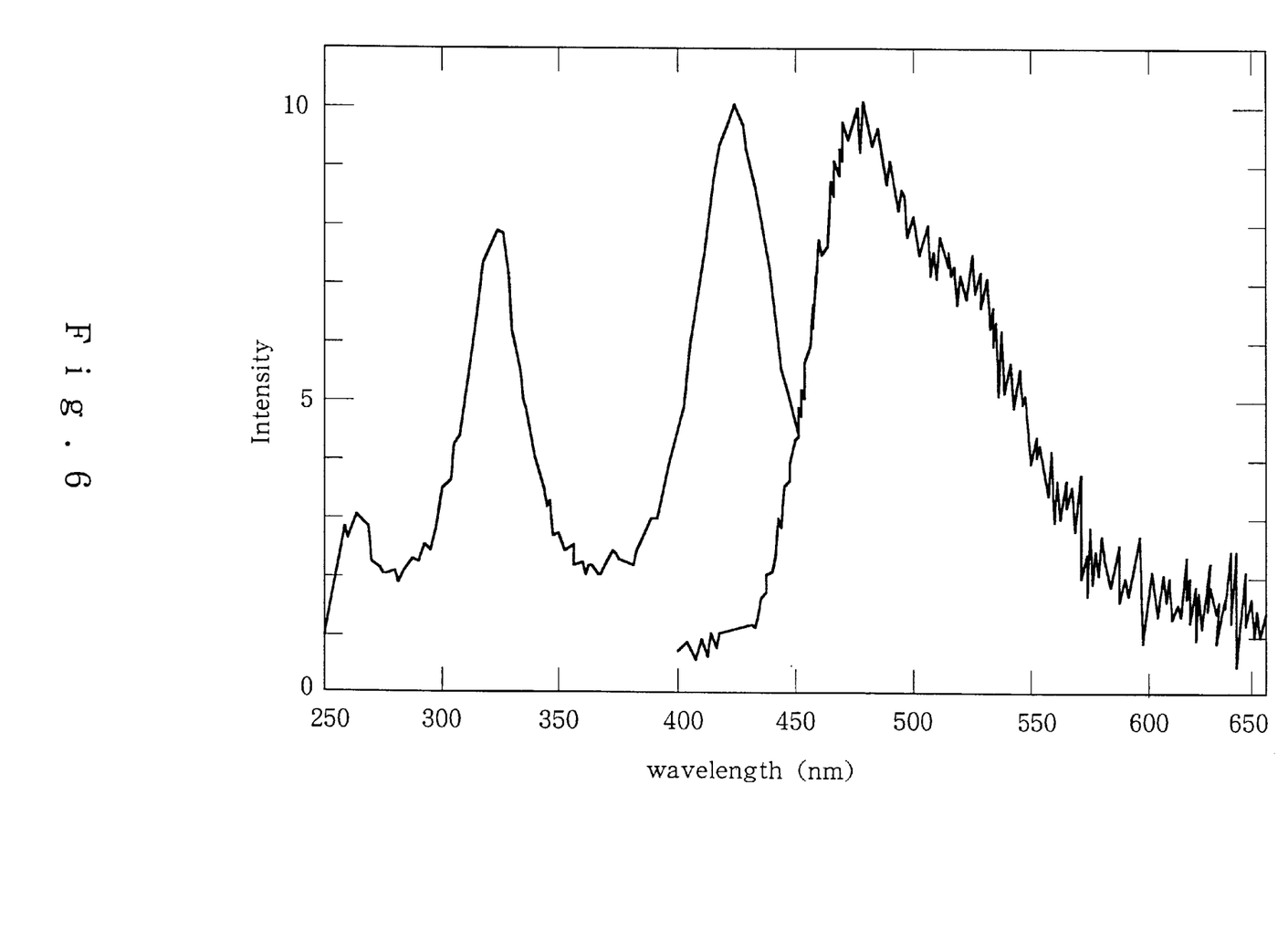
FIG. 6 is a graph showing the electro-luminescence of a $Sr_{1.905}Ga_2S_5:Ce_{0.095},K_{0.082}$ thin film EL device.

A thin film luminescence layer made of the above compound and an insulating layer were formed under the conditions specified in Table 1, and, further, a thin film EL device as shown in FIG. 1 was produced. This device exhibited blue electro-luminescence, which is shown in FIG. 6. The chromaticity coordinates of the electro-luminescence are: X=0.22 and Y=0.346. The luminance was 2.4 cd/m² when the device was driven at 1 kHz.

Figure 7:
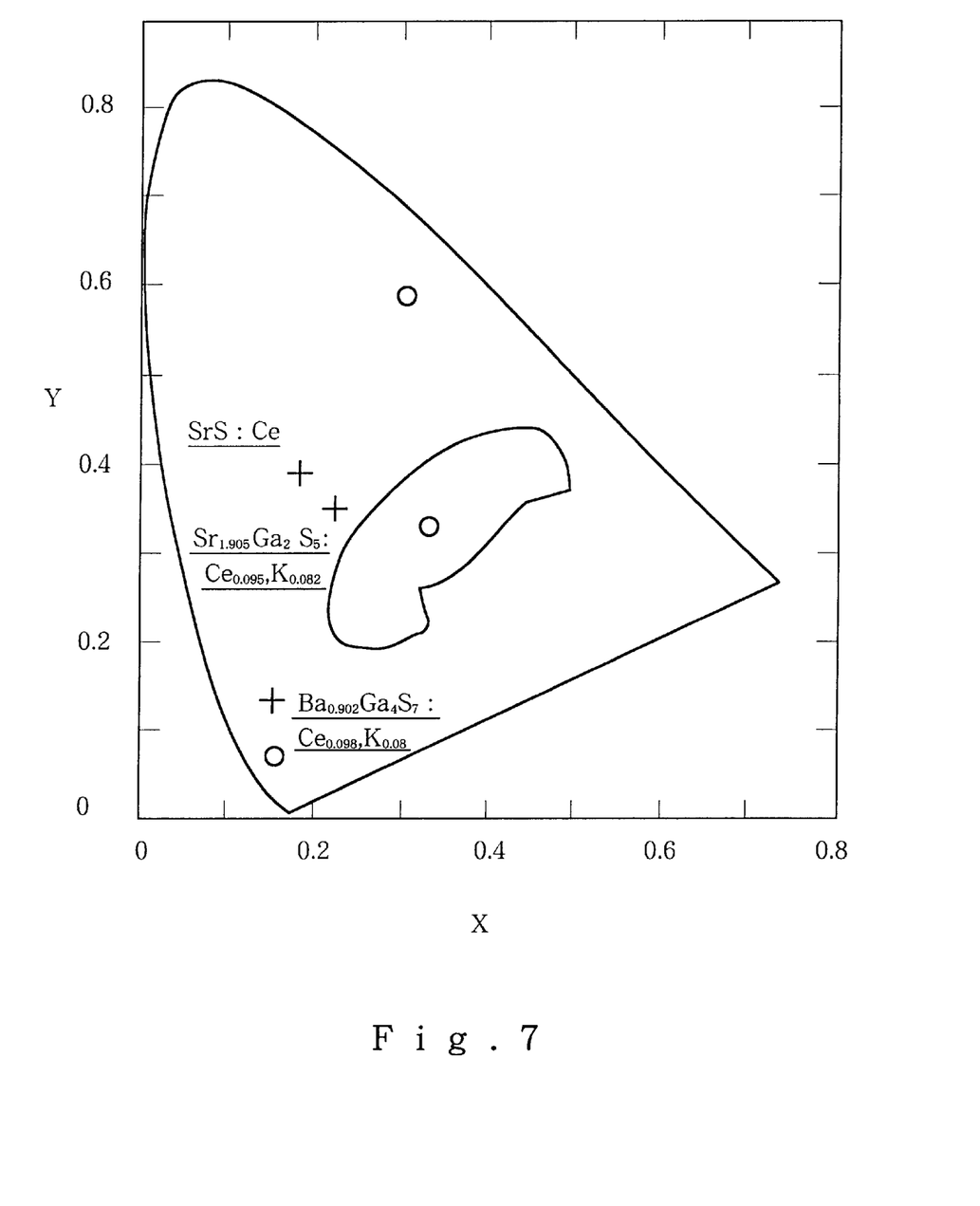
FIG. 7 is a chromaticity diagram showing the chromaticity coordinates of a $Sr_{1.905}Ga_2S_5:Ce_{0.095},K_{0.082}$ thin film EL device, a $Ba_{0.902}Ga_4S_7:Ce_{0.098},K_{0.08}$ thin film EL device and a SrS:Ce thin film EL device.

FIG. 7 shows the chromaticity coordinates (X=0.153, Y=0.136) of the $Ba_{0.902}Ga_4S_7:Ce_{0.098},K_{0.08}$ thin film EL device produced in Example 1, those (X=0.22, Y=0.346) of the $Sr_{1.905}Ga_2S_5:Ce_{0.095},K_{0.082}$ thin film EL device produced in Example 3 and those (X=0.18, Y=0.38) of a SrS:Ce thin film EL device for reference.

Example 4

$BaCO_3$ as a starting material was heated in a $H_2S$ atmosphere to 500° C. for 2 hours, to 600° C. for 2 hours and then to 900° C. for 4 hours, followed by screening to adjust particle sizes. The resulting material was heated to 1000° C. in a $H_2S$ atmosphere for 4 hours, followed by screening to again adjust particle sizes thus obtaining BaS. The BaS thus obtained was mixed with $Al_2S_3$, $CeCl_3$, KCl and $Eu_2O_3$ in molar ratios specified in Table 2 and then the obtained mixtures were each heated to 1000° C. in a $H_2S$ atmosphere for 5 hours.

TABLE 2

| | molar ratio | | | | | mol % | | mol % | | |
|---|---|---|---|---|---|---|---|---|---|---|
| | BaS | $Al_2S_3$ | $CeCl_3$ | KCl | $Eu_2O_3$ | | Ce | Eu | K |
| $Ba_{0.9905}Al_4S_7$ $Ce_{0.0095}, K_{0.0046}$ | 1 | 2 | 1 | 1 | 0 | | 0.95 | — | 0.46 |
| $Ba_{0.9911}Al_4S_7$ $Eu_{0.0089}$ | 1 | 2 | 0 | 0 | 0.5 | | — | 0.89 | — |
| $Ba_{1.989}Al_2S_5$ $Ce_{0.011}, K_{0.0015}$ | 2 | 1 | 1 | 1 | 0 | | 1.1 | — | 0.15 |
| $Ba_{1.989}Al_2S_5$ $Eu_{0.011}$ | 2 | 1 | 0 | 0 | 0.5 | | — | 1.1 | — |
| $Ba_{3.977}Al_2S_7$ $Eu_{0.023}$ | 4 | 1 | 0 | 0 | 0.5 | | — | 2.3 | — |
| $Ba_{4.975}Al_2S_8$ $Eu_{0.025}$ | 5 | 1 | 0 | 0 | 0.5 | | — | 2.5 | — |

Figure 8:
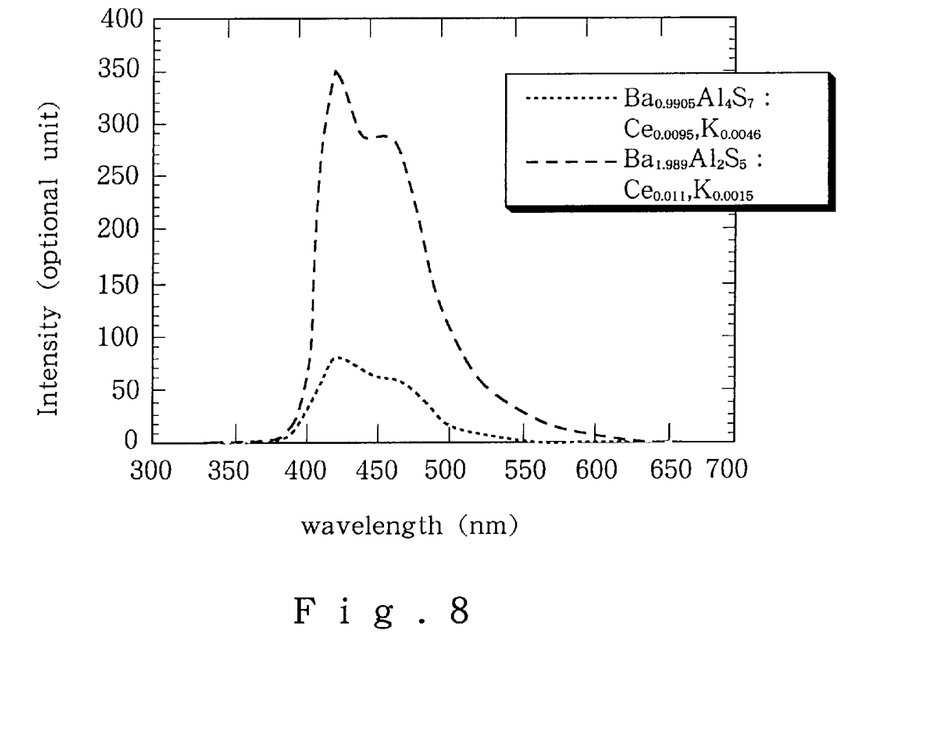
FIG. 8 shows the emission spectra of thioaluminates according to this invention wherein $M^2$ is Ba (Ce and K added)
Figure 9:
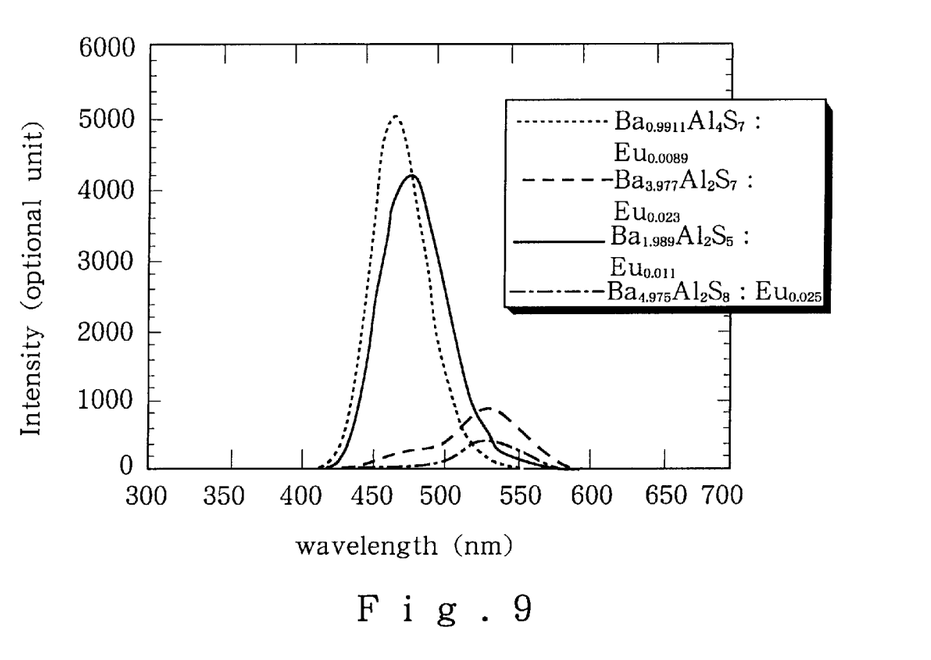
FIG. 9 shows the emission spectra of thioaluminates according to this invention wherein $M^2$ is Ba (Eu added)

The obtained compounds ($Ba_{0.9905}Al_4S_7$:$Ce_{0.0095}$, $K_{0.0046}$, $Ba_{1.989}Al_2S_5$:$Ce_{0.011}$,$K_{0.0015}$, $Ba_{0.9911}Al_4S_7$:$Eu_{0.0089}$, $Ba_{1.989}Al_2S_5$:$Eu_{0.011}$, $Ba_{3.977}Al_2S_7$:$Eu_{0.023}$ and $Ba_{4.975}Al_2S_8$:$Eu_{0.025}$) were excited at a proper wavelength between 280 and 350 nm and the emission spectra observed in this case are given in FIGS. 8 and 9. It can be understood from FIGS. 8 and 9 that the spectra have their respective peaks mainly in the blue region. Further, it can be understood therefrom that the full width at half maximum of the emission spectrum of the Eu-containing composition is smaller than the Ce-containing composition and is as small as about one-half of that of the Ce-containing composition.

Example 5

Figure 10:
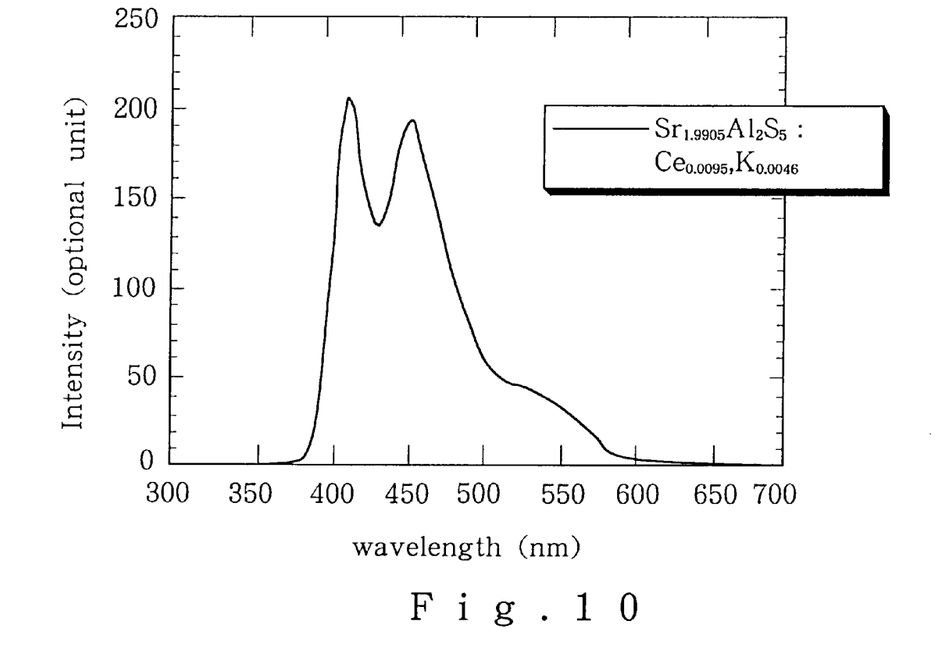
FIG. 10 shows the emission spectra of thioaluminate according to this invention wherein $M^2$ is Sr (Ce and K added)
Figure 11:
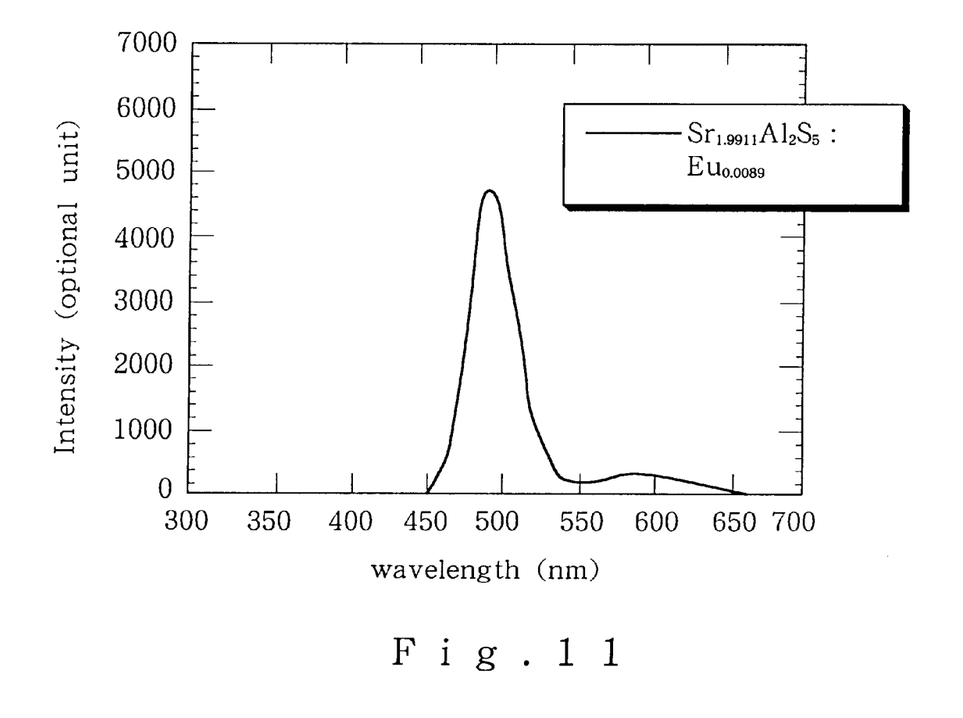
FIG. 11 shows the emission spectra of thioaluminate according to this invention wherein $M^2$ is Sr (Eu added)

SrS was mixed with $Al_2S_3$ while $CeCl_3$, KCl and $Eu_2O_3$ were also mixed, in respective molar ratios specified in Table 3, after which the obtained mixtures were each heated to 1000° C. in a $H_2S$ atmosphere for 5 hours thereby to obtain compounds ($Sr_{1.9905}Al_2S_5$:$Ce_{0.0095}$,$K_{0.0046}$ and $Sr_{1.9911}Al_2S_5$:Eu0.0089). The compounds so obtained were excited at a proper wavelength from 280 to 350 nm and the emission spectra observed in this case are given in FIGS. 10 and 11.

Example 6

Figure 12:
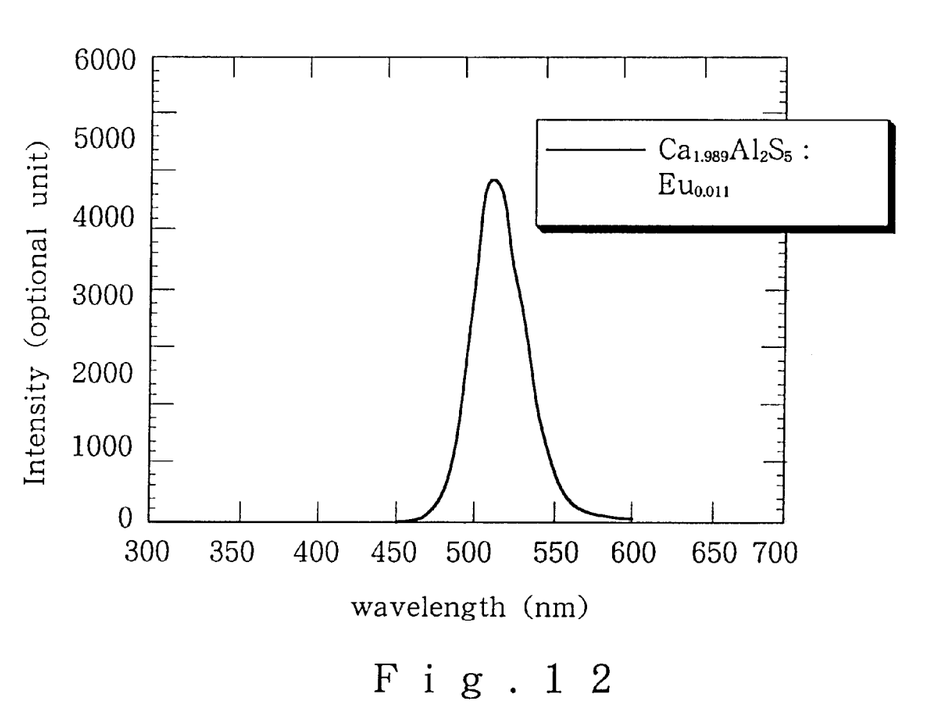
FIG. 12 shows the emission spectra of thioaluminate according to this invention wherein $M^2$ is Ca (Eu added).

CaS was mixed with $Al_2S_3$ and, on the other hand, $CeCl_3$, KCl and $Eu_2O_3$ are mixed together, in respective molar ratios specified in Table 4, after which the thus obtained mixtures were each heated to 1000° C. in a $H_2S$ atmosphere for 5 hours. Then the thus-obtained compound ($Ca_{1.989}Al_2S_5$:$Eu_{0.011}$) was excited at a proper wavelength of 320 nm and the emission spectra observed in this case are given in FIG. 12.

full width at half maximum of as small as about one-half of that of the Ce-containing composition thereby improving the former composition in chromatic purity.

As described above, this invention makes it possible to obtain a thin film EL composition excellent in chromaticity coordinates and chromatic purity, and a thin film EL device comprising said composition as the luminescence layer.

What is claimed is:

1. A thin film electro-luminescence composition comprising an alkaline earth metal thiogallate represented by the following compositional formula:

wherein $M^1$ is Sr or Ba; RE is a lanthanoid element; a and b are integers which are different from each other; and wherein x is 0.001 to 0.1 with the proviso that $Ba_{4-x}Ga_2S_7$:$RE_x$ is excluded.

2. A thin film electro-luminescence composition according to claim 1, wherein said a is 1 to 5 and said b is 1 to 2.

3. A thin film electro-luminescence composition according to claim 1, wherein said composition further contains a charge compensation agent selected from the group consisting of K, N, As and Sb, and the charge compensation agent is contained in an amount of 0.5 to 1.5 times of the x value.

4. A thin film electro-luminescence composition according to claim 1, wherein said alkaline earth metal thiogallate is represented by the following compositional formula:

TABLE 3

| | molar ratio | | | | mol % | | | mol % | |
| --- | --- | --- | --- | --- | --- | --- | --- | --- | --- |
| | SrS | $Al_2S_3$ | $CeCl_3$ | KCl | $Eu_2O_3$ | Ce | Eu | K | |
| $Sr_{1.9905}Al_2S_5$ $Ce_{0.0095}$, $K_{0.0046}$ | 1 | 2 | 1 | 1 | 0 | 0.95 | — | 0.46 | |
| $Sr_{1.9911}Al_2S_5$ $Eu_{0.0089}$ | 1 | 2 | 0 | 0 | 0.5 | — | 0.89 | — | |

5. A thin film electro-luminescence composition according to claim 1, wherein said alkaline earth metal thiogallate is represented by the following compositional formula:

TABLE 4

| | molar ratio | | | | mol % | | | mol % | |
| --- | --- | --- | --- | --- | --- | --- | --- | --- | --- |
| | CaS | $Al_2S_3$ | $CeCl_3$ | KCl | $Eu_2O_3$ | Ce | Eu | K | |
| $Ca_{1.989}Al_2S_5$ $Eu_{0.011}$ | 2 | 1 | 0 | 0 | 0.5 | — | 1.1 | — | |

[Industrial Applicability]

It has been confirmed in this invention that the emission peaks of $Ba_{0.9905}Al_4S_7$:$Ce_{0.0095}$, $K_{0.046}$, $Ba_{1.989}Al_2S_5$:$Ce_{0.011}$,$K_{0.015}$ and so on appear in the neighborhood of 430 nm. The wavelengths of emission peaks thereof are shorter than those (480 nm) of SrS:Ce and those (460 nm) of $MGa_2S_4$:Ce (wherein M is an alkaline earth metal) by as much as 50 to 30 nm. Further, it has been ascertained that the Eu-containing composition exhibits a 6. A thin film electro-luminescence composition according to claim 1, wherein said alkaline earth metal thiogallate is represented by the following compositional formula:

7. A thin film electro-luminescence composition comprising an alkaline earth metal thioaluminate represented by the following compositional formula:

wherein $M^2$ is Ca, Sr or Ba; RE is a lanthanoid element; c and d are integers which are different from each other; and y is 0.001 to 0.1.

8. A thin film electro-luminescence composition according to claim 7, wherein said c is 1 to 5, and wherein said d is 1 to 2.

9. A thin film electro-luminescence composition according to claim 7, wherein said composition further contains a charge compensation agent selected from the group consisting of K, Na, N, As and Sb, and the charge compensation agent is contained in an amount of 0.5 to 1.5 times of the y value.

10. A thin film electro-luminescence composition according to claim 7, wherein the alkaline earth metal thioaluminate is a member selected from the group consisting of $Ba_{1-y}Al_4S_7:Ce_y$, $Sr_{2-y}Al_2S_5:Ce_y$, $Ba_{2-y}Al_2S_5:Ce_y$, $Ba_{1-y}Al_4S_7:Eu_y$, $Sr_{2-y}Al_2S_5:Eu_y$, $Ba_{4-y}Al_2S_7:Eu_y$, $Ca_{2-y}Al_2S_5:Eu_y$, $Ba_{2-y}Al_2S_5:Eu_y$ and $Ba_{5-y}Al_2S_8:Eu_y$.

11. A thin film electro-luminescence device comprising an upper electrode, an upper insulating layer, a buffer layer, a luminescence layer, a lower insulating layer, a lower electrode and a glass substrate, said luminescence layer comprising a thin film electro-luminescence composition according to any one of claims 1 to 10.

12. A thin film electro-luminescence composition consisting essentially of an alkaline earth metal thiogallate represented by the following compositional formula:

wherein $M^1$ is Sr or Ba; RE is a lanthanoid element; a and b are integers which are different from each other; and x is 0.001 to 0.1 with the proviso that $Ba_{4-x}Ga_2S_7:RE_x$ is excluded.

13. A thin film electro-luminescence composition consisting essentially of an alkaline earth metal thioaluminate represented by the following compositional formula:

wherein $M^2$ is Ca, Sr or Ba; RE is a lanthanoid element; c and d are integers which are different from each other; and y is 0.001 to 0.1.

* * * * *

UNITED STATES PATENT AND TRADEMARK OFFICE
CERTIFICATE OF CORRECTION

PATENT NO.   : 6,074,575
DATED        : June 13, 2000
INVENTOR(S)  : Akiko Sugioka et al.

It is certified that error appears in the above-identified patent and that said Letters Patent is hereby corrected as shown below:

Title page,
Left column, Item [63] Related U.S. Application Data, "Continuation-in-part of application No. 08/669,490, Nov. 29, 1996, abandoned." should be -- Continuation-in-part of application No. 08/669,490, filed as application No. PCT/JP95/01739, Aug. 31, 1995, abandoned. --.

Signed and Sealed this

Eighteenth Day of September, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,074,575  
DATED : June 13, 2000  
INVENTOR(S) : Akiko Sugioka et al.

Page 1 of 1

It is certified that error appears in the above-identified patent and that said Letters Patent is hereby corrected as shown below:

<u>Title page,</u>
Item [73] Assignee, "Mitsui Mining & Smelting Co., Ltd., Osaka, Japan" should be -- Mitsui Mining & Smelting Co., Ltd., Tokyo, Japan and Sharp Kabushikikaisha, Osaka, Japan --.

Signed and Sealed this

Second Day of April, 2002

Attest:

JAMES E. ROGAN  
*Attesting Officer*   *Director of the United States Patent and Trademark Office*